United States Patent [19]
Vander Heyden et al.

[11] Patent Number: 5,247,838
[45] Date of Patent: Sep. 28, 1993

[54] DOUBLE WING VORTEX FLOWMETER

[75] Inventors: William H. Vander Heyden, Mequon, Wis.; Craig V. Warne, Tulsa; Ronald L. Brunkalla, Bixby, both of Okla.

[73] Assignee: Badger Meter, Inc., Milwaukee, Wis.

[21] Appl. No.: 812,895

[22] Filed: Dec. 19, 1991

[51] Int. Cl.$^5$ .............................. G01F 1/32
[52] U.S. Cl. ................................. 73/861.22
[58] Field of Search ....................... 73/861.22, 861.24

[56] References Cited

U.S. PATENT DOCUMENTS

| | | |
|---|---|---|
| 3,116,639 | 1/1964 | Bird . |
| 3,886,794 | 6/1975 | McShane . |
| 4,171,643 | 10/1979 | Frick ............................... 73/861.24 |
| 4,181,020 | 1/1980 | Herzl . |
| 4,275,602 | 6/1981 | Fujishiro et al. . |
| 4,297,898 | 11/1981 | Herzl . |
| 4,526,040 | 7/1985 | Matsubara ....................... 73/861.24 |
| 4,699,012 | 10/1987 | Lew et al. . |
| 4,754,649 | 7/1988 | Lew . |
| 4,831,883 | 5/1989 | Kamenster . |
| 5,076,105 | 12/1991 | Lew ................................. 73/861.24 |
| 5,095,760 | 3/1992 | Lew ................................. 73/861.24 |

FOREIGN PATENT DOCUMENTS 57-54809 4/1982 Japan .

*Primary Examiner*—Herbert Goldstein

[57] ABSTRACT

A vortex flowmeter has an elongated vortex generator in the flow passage of a body and transverse to the direction of flow. A first wing is located in the flow passage downstream of the generator and a second wing is located downstream from the first wing. A sensor is associated with each wing to provide a signal responsive to movement of the wing, and the signals are combined to have external noise components of the signals cancel each other. In one embodiment, the wings are shorter than a vortex street wavelength, and the wings are separated by a distance that is an odd multiple of the half wavelength. In another embodiment, the wings each have a length of about one wavelength.

4 Claims, 2 Drawing Sheets

DOUBLE WING VORTEX FLOWMETER

BACKGROUND OF THE INVENTION

This invention relates to a meter for measuring fluid flow by detecting Karman vortices, and particularly to an improved vortex flowmeter that is substantially uneffected by external vibrations.

It is well know that placing an elongated obstruction transverse to the direction of fluid flow within a conduit will result in the generation of vortices in the wake of the obstruction. The vortices are induced by and shed alternately from opposite sides of the obstruction, which is called a bluff body. This has been referred to as the Karman effect. The frequency of the vortex shedding is proportional to the width of the bluff body and the velocity of flow, so that detecting the frequency can generate signals indicative of fluid flow velocity. The shedding frequency is well known and is described by the equation $f = N_s V/D$, where $N_s$ is the Strouhal number, V is the fluid velocity past the bluff body, and D is the diameter or width of the bluff body.

The vortices are generated in pairs, often referred to as two rows, and are disposed on either side of the longitudinal axis of the bluff body. The rotational direction of the individual vortices is such that each reinforces the other and combines with the other. As the vortices proceed away from the bluff body, the result is loss of individual character for each vortex and the creation of sinuous-like fluid motion transverse to the direction of the velocity of the fluid. In effect, the vortices form a standing transverse wave beyond the bluff body and the wavelength is $1 = V/f = D/N_s$. The sinuous-like wave is persistent, with normally expected dissipation, unless disrupted by some mechanical means. For example, a physical member disposed longitudinally in the stream will substantially dissipate the vortex street formed by the two rows if the length of the member is sufficient. In general, the strength of the vortices increases with increased velocity and with increased fluid density in the relationship of $\rho V^2$.

A variety of means for detecting the vortices have been proposed, including the use of acoustic detection (U.S. Pat. No. 3,886,794 issued Jun. 3, 1975 to McShane), hot wires (U.S. Pat. No. 4,275,602 issued Jun. 30, 1981 to Fujishiro, et al), and a physical member disposed downstream of the obstruction and subject to deflection as the alternating vortices pass by. In this latter approach, the physical member often takes the form of a wing and the wing may either be pivotably mounted in the conduit (U.S. Pat. No. 3,116,629 issued Jan. 7, 1964 to Bird and U.S. Pat. No. 4,181,020 issued Jan. 1, 1980 to Herzl) or the wing may be fixed to the conduit (U.S. Pat. No. 4,699,012 issued Oct. 13, 1987 to Lew, et al).

A major shortcoming of flowmeters designed to detect vortex shedding arises from external forces and accelerations in the attached piping systems. Because the physical detection member of a vortex flowmeter is designed to be deflected by the vortices, any other forces which would cause deflection, such as external vibration of the conduit, will be detected as well. This is especially true at lower fluid velocities when the vortex strength is diminished. The external forces (the "noise") thereby adversely affect the accuracy of the signal generated by the physical member. Although many compensating methods have been employed to minimize the noise effect, each has the potential for only small or inadequate reduction of the influences of noise. The present application is directed to an improved vortex flowmeter in which the effects of external noise are substantially eliminated.

SUMMARY OF THE INVENTION

In accordance with the invention, a vortex flowmeter includes a body having a flow passage, an elongated vortex generator in the flow passage transverse to the direction of flow through the passage, a first wing in the passage downstream of the generator, and a second wing in the passage downstream and independent of the first wing. A sensor is associated with each wing to provide a signal in response to the movement of each wing. Means are provided for combining the signals from the sensors to cause external noise components of the signals to tend to cancel each other.

The length of each wing and the distance between the wings may be selected in two fashions depending on the form of noise cancellation desired. In a first embodiment, the wing length is much shorter than the vortex street wave length, preferably about one-quarter of the wave length, and the second wing is located downstream of the first wing a distance that is near odd multiples of the half wave length of the vortex street. The wings have substantially the same frequency response. The sensor associated with each wing will provide a signal in response to the movement of each wing by the vortex street and the movement of each wing by external noise or pipe vibrations. Providing substantially the same frequency response in each wing assures that each wing will deform in a substantially identical manner due to either vortex motions or external motions. The signals from the two sensors are combined to cause the noise components of the two signals to tend to cancel each other and the vortex produced signal components to reinforce one another.

In a second embodiment, the wings are substantially longer, preferably about one wave length, and the downstream separation of the wings is not significantly determined by the vortex street wave length. Again, each wing is designed for substantially identical frequency response. The first wing structure substantially absorbs the vortex energy from the fluid stream by mechanical contact. The second wing is then substantially free of vortex street activity. However, each wing is responsive to external noise and vibrations in substantially the same manner. The signals from the two sensors are combined to cause the noise components of the two signals to tend to cancel each other.

The sensors may take a variety of forms, including thermal, optical, and pressure sensitive sensors. Preferably, the sensors are piezoelectric transducers which may be mounted within the wings. The common planar mounting of the wings in the flow passage will result in similar motions of the wings when caused by external noise or vibrations. In the first embodiment, and depending upon the polarity of the signals generated by each sensor, the sensor signals are either added or subtracted to cause the external noise signal to cancel and the vortex signal to reinforce in the resulting combined signal. In the second embodiment, the second wing sensor contains little or no vortex signal and the addition or subtraction of the wing signals, dependent again on polarity, will only cancel the externally induced portions of the signals.

The second embodiment can take advantage of advanced signal processing, such as adaptive filtering using modern digital signal processors, which is more appropriately applied if the noise referencing signal contains no vortex signal. The first embodiment provides for less expensive signal processing.

In the preferred embodiments, the wings are each mounted rigidly at one end to the body and are cantilevered therefrom such that they extend transverse to the longitudinal axis of the flow passage and therefore transverse to the direction of flow.

The invention also resides in a method of measuring flow through a flow passage which includes the steps of generating vortex rows on each side of the longitudinal axis of the flow passage, detecting the vortices and external noise at one position along the axis, detecting the vortices and noise at a second position along the axis which is spaced from the first position a distance that is about an odd multiple of the half wave length of the vortex streets, generating a signal at each detection position representative of the amplitude of the vortices and noise at that position, and combining the signals to enhance the vortex signals and reduce the effect of the external noise on the signals.

The invention further resides in a method of measuring flow through a flow passage which includes the steps of generating vortex rows on each side of the longitudinal axis of the flow passage, detecting the vortices and external noise at one position along the axis, detecting the noise at a second position along the axis which is spaced from the first position, generating a signal at each detection position representative of the amplitude of the vortices or noise at that position, and combining the signals to reduce the effect of the external noise on the signals.

It is a principal object of the invention to provide an extremely accurate vortex flowmeter.

It is another object of the invention to provide a vortex flowmeter which substantially eliminates errors in measurement resulting from external vibrations or other sources of external noise.

It is a further object of the invention to provide an accurate vortex flowmeter of simple and rugged construction.

The foregoing and other objects and advantages of the invention will appear in the following detailed description. In the description, reference is made to the accompanying drawings which illustrate preferred embodiments of the invention.

DETAILED DESCRIPTION OF THE PREFERRED EMBODIMENTS

Figure 1:
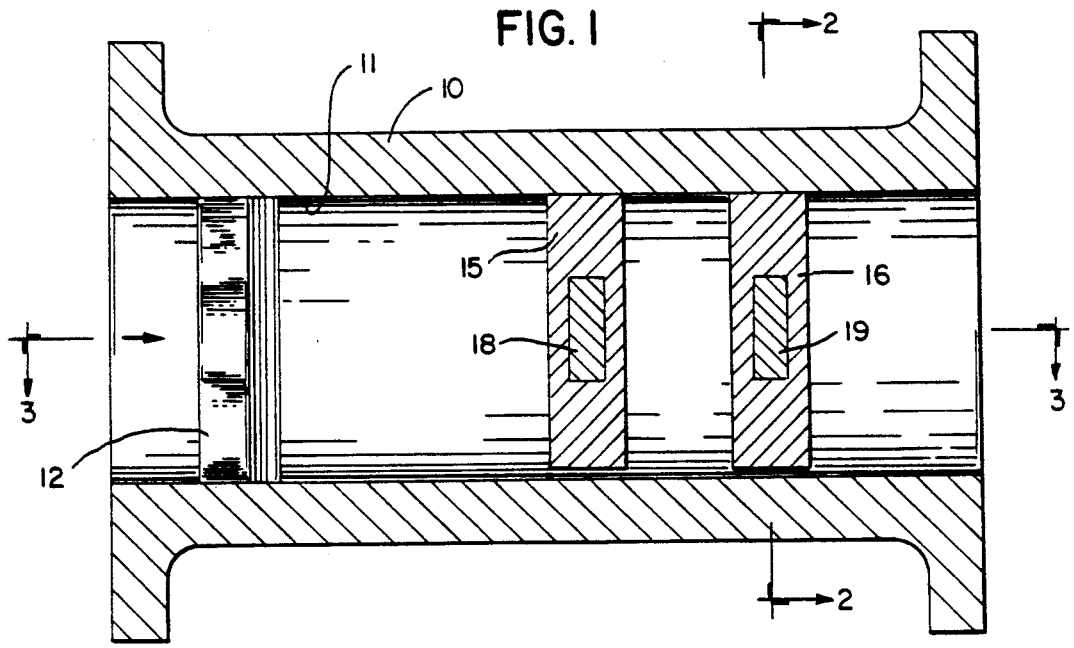
FIG. 1 is a longitudinal view in vertical section taken through a flowmeter in accordance with the present invention.

The vortex flowmeter includes a body 10 of relatively rigid construction so that it will move as a unit when subjected to external forces such as vibrations. The flowmeter body 10 is adapted to be inserted in the piping for the flow of fluid which is to be measured. The body 10 defines a flow passage 11 of circular cross-section. An obstruction 12 in the form of an elongated bluff body is disposed across the flow passage 11 and along the longitudinal axis 13 of the flow passage. In a known manner, the obstruction 12 will function as a vortex generator producing vortex rows on either side of the longitudinal axis.

Downstream of the vortex generator 12 is a first wing 15 which is rigidly attached at its top to the body 10 and which extends downwardly transverse to the direction of flow through the passage 11 and through the longitudinal axis 13. The bottom end of the wing 15 is free of the body 10 so that the first wing 15 is cantilevered within the flow passage 11. A second wing 16 identical in construction to the first wing 15 is disposed downstream of the first wing 15.

Both of the wings 15 and 16 contain internally embedded sensors 18 and 19, respectively. The sensors 18 and 19 are in the form of piezoelectric transducers. The sensors 18 and 19 are of known construction and they comprise a piezoelectric ceramic which, when subjected to strain, will produce a voltage signal indicative of the strain. Useable ceramics would be those made by Keramos, Inc. of Indianapolis, Ind. and identified as Kezite K15 and K350 ceramics.

Figure 3:
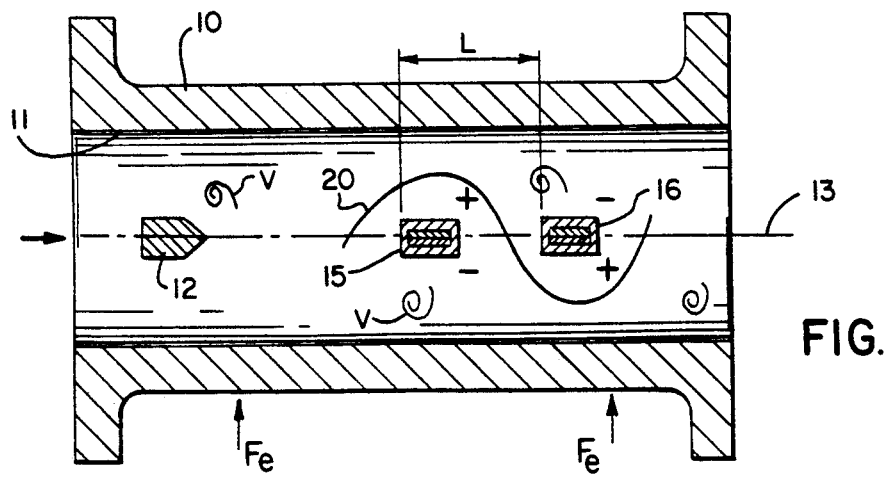
FIG. 3 is a view in longitudinal section taken in the plane of the line 3—3 of FIG. 1.

As shown in FIG. 3, the vortices V shed from the vortex generator 12 will be spaced based upon the dimensions of the vortex generator 12 and the Strouhal number of the flow. Although the vortices are independently shed from either side of the vortex generator 12, Von Karman showed that the only stable shedding that can exist is if the swirl of each vortex reinforces its opposite partner. It is therefore possible to consider that two oppositely shed vortices formed together and that the paired vortices form a dynamic wave oscillating to and fro across the areas of the wings 15 and 16. This is illustrated schematically in FIG. 3 by the wave 20. Although the wave 20 in FIG. 3 is illustrated as being a regular sinusoidal curve, in reality the wave would be very chaotic and somewhat hyperbolic. However, the two wings 15 and 16 are disposed within the paths of the vortex street such that the wings will be subjected to deflections caused by the vortices that are 180 degrees out of phase. To accomplish this, the wings 15 and 16 are spaced apart a distance L which is about an odd multiple of a half wave length of the vortex street generated by the vortex generator 12. Thus, while one wing is being deflected by the vortices in one direction the other wing will be deflected in the opposite direction relative to the longitudinal axis 13. If the two wings are identical in their frequency response, and the sensors 18 and 19 are arranged so that their portions on either side of the longitudinal axis 13 are of like polarity, the voltage signals generated by the vortices will be of opposite polarity, as shown in FIG. 3. If the two voltage signals of opposite polarity are subtracted, then the resulting time based signal will be twice the individual vortex wave.

If an external motion is now imposed upon the body 10 of the flowmeter by an external force $F_e$, the motion will cause both wings 15 and 16 to accelerate in the same direction relative to the longitudinal axis 13. Since both wings would tend to have the same motion due to the external force, the external motion will add to the signal from one of the sensors and substract from the signal of the sensor. This can be demonstrated in a mathematical sense, as follows. If the signals developed on the wings are $W_{15}$ and $W_{16}$ and the sensors are of like polarity, the sensor signals will each contain a vortex component (S) and a noise component (n). The two sensors signals will then be:

$$W_{15}=S+n \text{ and } W_{16}=-S+n$$

If the two signals are combined by subtraction, the result is:

$$W_{15}=(S+n)-(-S+n)=2S+n-n=2S$$

The same result is achieved if the sensors are arranged to have opposite polarity and the sensor signals are then added. This is shown as follows:

$$W_{15}=S+n \text{ and } W_{16}=S-n$$

$$W_{15}+W_{16}=(S+n)+(S-n)=2S+n-n=2S$$

Figure 4:
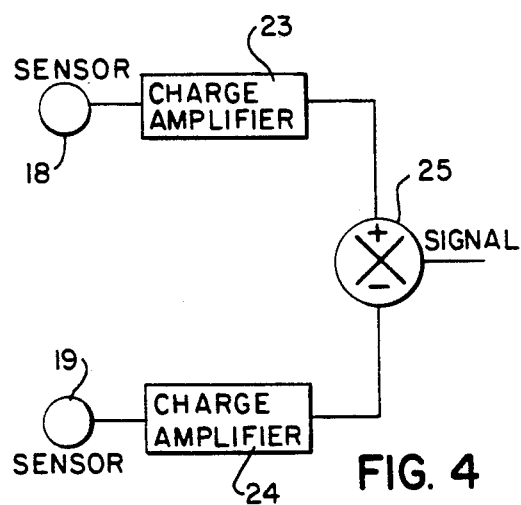
FIG. 4 is a schematic diagram of a circuit for combining the signals of the sensors.

FIG. 4 shows a simplified arrangement for combining the signals of the sensors 18 and 19. The voltage signal generated by each of the sensors is delivered to a charge amplifier 23 or 24 where the signal is amplified and the two signals are then combined in a summing circuit 25, either subtracted or added, depending upon the polarity of the voltage signals from the sensors 18 and 19.

Figure 2:
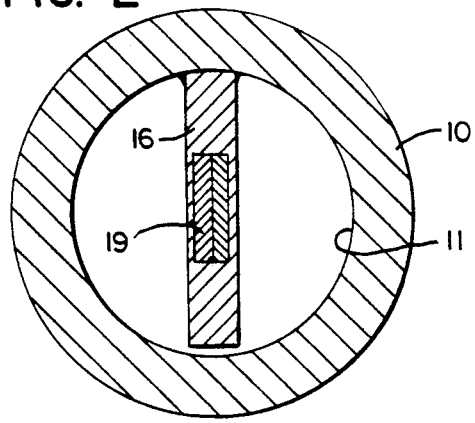
FIG. 2 is a view in vertical cross-section taken in the plane of the line 2—2 of FIG. 1.
Figure 5:
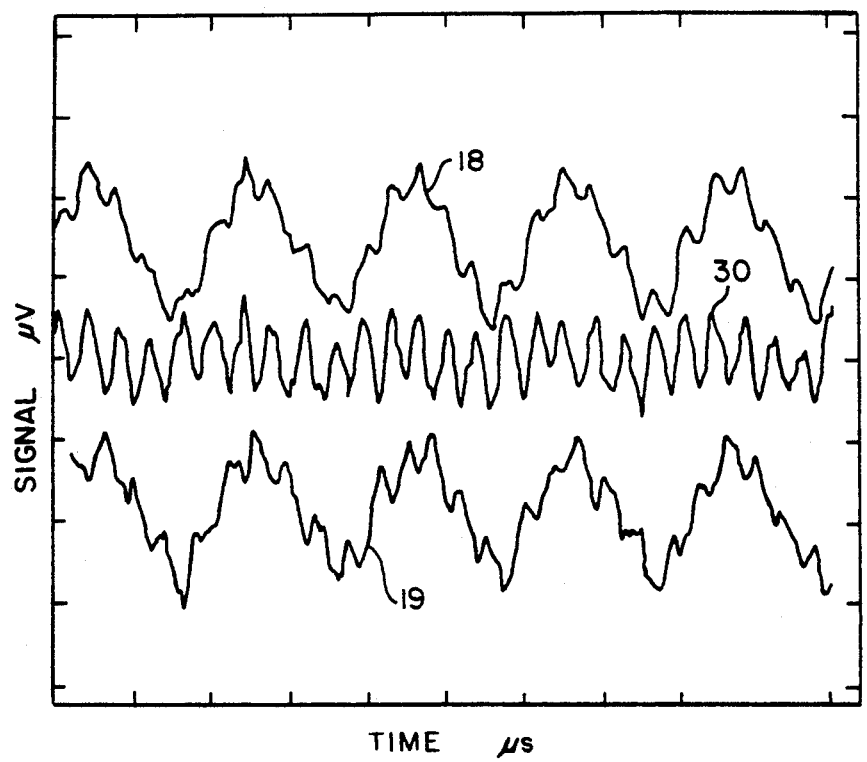
FIG. 5 is a graph showing the signals from each of the sensors and the combined signal.

The result of the invention is to amplify the actual signal indicative of fluid flow while substantially eliminating signals due to noise. The result is illustrated graphically in FIG. 5 which is a plot of the signals from sensors 18 and 19 and the signal 30 that results from combining the sensor signals. FIG. 5 is a plot of millivolts verses milliseconds and it illustrates that the resulting output signal eliminates much of the noise and results in a composite signal 30 that gives an accurate indication of the frequency of the vortices and therefore of the fluid flow. The graph of FIG. 5 was generated by subjecting a prototype of the vortex flowmeter of FIGS. 1-3 to the flow of carbon dioxide gas at 20 psi and at a rate of about 11 feet per second. The vortex flowmeter prototype was placed on a vibration table that was driven to oscillate at $\frac{3}{4}$ g amplitude to induce the external motions.

Although the invention is shown as incorporating piezoelectric transducers as the sensors, other forms of sensors could be employed, including other forms of pressure sensors. For example, the movement of the wings could be detected optically or acoustically.

The wings are constructed to be as nearly identical as possible. The most important physical characteristic of the wings that must be matched is their frequency response. The wings must be dimensioned and manufactured to have a natural resonance frequency that is well above the operating frequencies. Then, slight variations in manufacturing tolerances will have little effect upon the frequency response since the frequency response at low levels will be substantially flat for the two wings.

Figure 6:
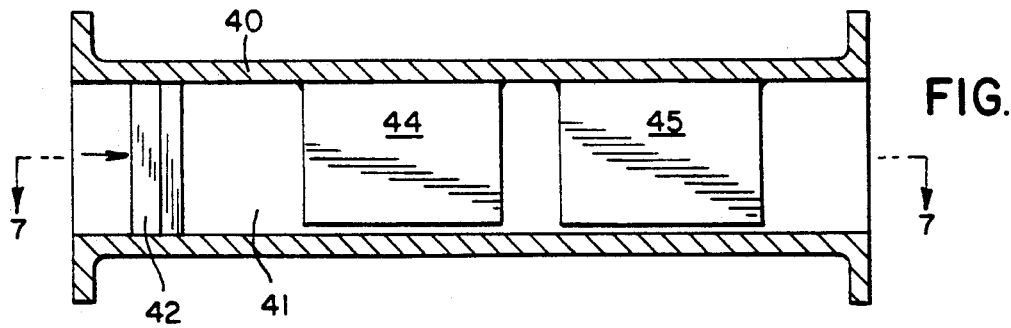
FIG. 6 is a longitudinal view in vertical section taken through a second embodiment of a flowmeter in accordance with the present invention.
Figure 7:
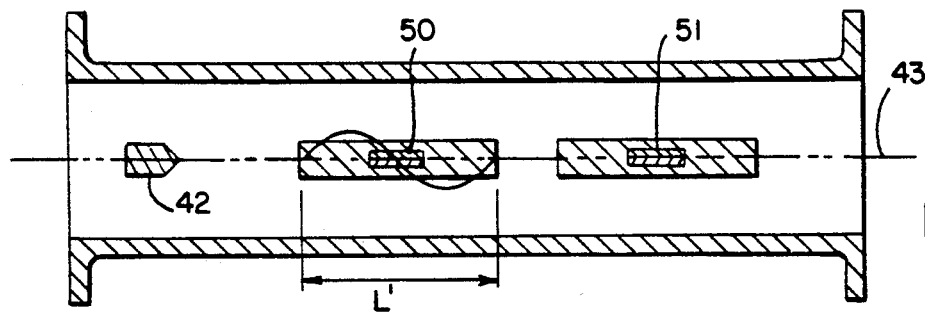
FIG. 7 is a view in longitudinal section taken in the plane of the line 7—7 of FIG. 6.

FIGS. 6 and 7 illustrate a second embodiment of the double wing vortex flowmeter. As in the first embodiment, a relatively rigid body 40 is adapted to be inserted in the piping for the flow of fluid to be measured. The body defines a flow passage 41 of circular cross section. An elongated bluff body 42 is disposed across the flow passage 41 and along the longitudinal axis 43 of the flow passage. A first wing 44 is disposed downstream of the bluff body 42 and a second wing 45 is disposed downstream of the first wing 44. The wings 44 and 45 are each joined at one end to a side of the body 40 and are cantilevered therefrom into the flow passage 41. The wings 44 and 45 may be cantilevered from opposite sides of the body or may be mounted rigidly to the body 40 at both ends, if desired. The wings 44 and 45 are identical in construction so that they have the same resonant frequency.

Both of the wings 44 and 45 contain internally embedded sensors 50 and 51, respectively. The sensors 50 and 51 may be the same or similar to the sensors used in the first embodiment of the invention. The first wing 45 should have a length L' in the direction of fluid flow that is about equal to a wave length of the vortex streets generated by the bluff body 42. The first wing 44 will be deflected by the effects of the vortices passing by it as well as by external vibrations or other sources of noise. The result will be that the sensor 50 will sense and provide a signal that is indicative of both the amplitude of the vortex street and the amplitude of the noise. By providing the first wing 44 with a length L' that is about a wave length of the vortex streets, the first wing 44 will absorb the vortex street so that fluid flow encountering the second wing 45 will be substantially free of the vortex street. Under such conditions, the second wing 45 will be deflected only by noise and the sensor 51 embedded in the second wing 45 will sense and provide a signal indicative only of deflections due to noise. By combining the signals from the two sensors, the noise component can cancel out with the result that a signal indicative solely of the amplitude of the vortex street will result.

Figure 8:
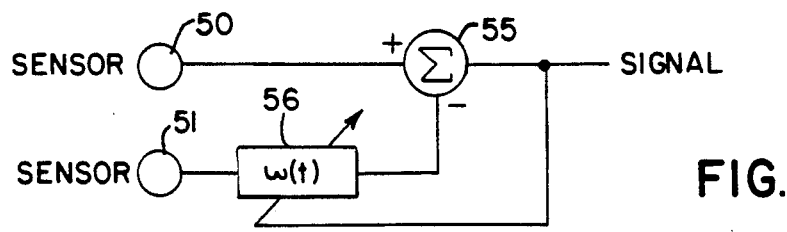
FIG. 8 is a schematic diagram of a circuit for combining the signals of the sensors of the second embodiment.

FIG. 8 shows a method of combining the signals of the sensors 50 and 51 using digital signal processing with an adaptive filter algorithm. The input signal from the first wing sensor 50 that contains both the vortex and noise components is a primary signal that is fed to a summing circuit 55. The signal from the second wing sensor 51 is a reference signal that contains only noise, and the reference signal is fed to an adaptive filter 56 whose algorithm W(t) produces a signal that is subtracted from the primary signal at the summing circuit 55 to produce an output signal substantially free of noise.

The term "wings" as used in this application is not meant in a limiting sense and is not meant to define a particular shape or structure. Instead, the term is used to refer to any physical element imposed downstream of the vortex generator and which will be subjected to deflection by the vortex streets or noise, or both.

We claim:

1. A vortex flowmeter, comprising:
    a body having a flow passage;
    a vortex generator in the flow passage transverse to the direction of flow through the passage;
    a first wing in the passage downstream of the generator, said first wing being exposed to the flow through the passage and having a length in the direction of flow sufficient to substantially absorb the vortex energy of the vortex street leaving the generator;

a second wing in the passage downstream and independent of the first wing, said second wing having a frequency response substantially the same as that of the first wing, said second wing being exposed to the flow through the passage;

a sensor associated with each wing, the sensors each providing a signal in response to movement of the wings; and means for combining the signals from the sensors to provide a combined signal indicative of fluid flow and in which external noise in the signals tends to cancel.

2. A vortex flowmeter in accordance with claim 1 wherein the first and second wings are identical.

3. A vortex flowmeter in accordance with claim 1 wherein the first and second wings each have a length of about one wavelength of the vortex street.

4. A method of measuring flow through a flow passage, comprising;

generating vortex rows on either side of a longitudinal axis of the flow passage;

locating a sensing element at a first position along the axis and exposed to the flow through the passage;

detecting the vortex and external noise at the first position;

generating a signal at the first detection position representative of the amplitude of the vortices and noise;

substantially absorbing the energy of the vortex street at the first position;

locating a sensing element at a second position along the axis that is spaced downstream of the first position and exposed to the flow through the passage;

detecting the noise at the second position;

generating a signal at the second detection position representative of the amplitude of the noise; and combining the signals to enhance the vortex signals and reduce the effect of the noise on the signals.

* * * * *

UNITED STATES PATENT AND TRADEMARK OFFICE
CERTIFICATE OF CORRECTION

PATENT NO. : 5,247,838

DATED : Sep. 28, 1993

INVENTOR(S) : Vander Heyden, et al.

It is certified that error appears in the above-identified patent and that said Letters Patent is hereby corrected as shown below:

Col. 8, Line 7 change "vortex" to -- vortices --.

Signed and Sealed this

Twelfth Day of April, 1994

Attest:

BRUCE LEHMAN

Attesting Officer     Commissioner of Patents and Trademarks